(12) United States Patent
Goodrich et al.

(10) Patent No.: US 8,277,588 B2
(45) Date of Patent: Oct. 2, 2012

(54) METHOD OF ADHERING AN OBJECT TO THE EXTERIOR OF A MOTOR VEHICLE

(75) Inventors: Gayle Goodrich, Fort Wayne, IN (US); Scott Watkins, Uniondale, IN (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 625 days.

(21) Appl. No.: 12/490,822

(22) Filed: Jun. 24, 2009

(65) Prior Publication Data
US 2010/0330322 A1 Dec. 30, 2010

(51) Int. Cl.
*B32B 33/00* (2006.01)
*B32B 37/02* (2006.01)
(52) U.S. Cl. .......... 156/91; 156/155; 156/289; 156/305; 428/31; 428/40.1; 428/41.7; 428/99
(58) Field of Classification Search .................. None
See application file for complete search history.

(56) References Cited

U.S. PATENT DOCUMENTS

| | | | |
|---|---|---|---|
| 3,431,166 A | | 12/1967 | Mizutani et al. |
| 3,606,431 A | * | 9/1971 | Kunevicius ............... 293/128 |
| 4,546,021 A | * | 10/1985 | Mears ....................... 428/31 |
| 4,605,575 A | * | 8/1986 | Auld et al. ................. 428/14 |
| 4,691,457 A | * | 9/1987 | Peroni ...................... 40/768 |
| 5,698,276 A | * | 12/1997 | Mirabitur .................. 428/31 |
| 2004/0099365 A1 | * | 5/2004 | Berg ......................... 156/91 |

FOREIGN PATENT DOCUMENTS
GB        1449833 A  *  9/1974
WO   WO 2007015264 A2  *  2/2007

* cited by examiner

*Primary Examiner* — David Sample
*Assistant Examiner* — Jeff Vonch
(74) *Attorney, Agent, or Firm* — Jeffrey P. Calfa; Mark C. Bach

(57) ABSTRACT

Dissolving paper (22) covers pressure sensitive adhesive (20) on a mounting face (18) of an object (16) to be mounted on an exterior surface of a body panel (10) of a motor vehicle by a mechanical fastening system (24). The mounting is exposed to a water wash. Water begins to be absorbed by the dissolving paper through the edge of the paper's outer perimeter. As the paper increasingly absorbs water, it dissolves in the water exposing the adhesive which then adheres to the panel.

7 Claims, 1 Drawing Sheet

METHOD OF ADHERING AN OBJECT TO THE EXTERIOR OF A MOTOR VEHICLE

FIELD OF THE INVENTION

This invention relates generally to the mounting of objects, such as trim pieces, moldings, mirrors, etc., on the exteriors of motor vehicles such as trucks and cars. More particularly the invention relates to achieving an adhesive attachment of such objects on vehicle exteriors after they have been mechanically fastened to the exteriors.

BACKGROUND OF THE INVENTION

Objects that are commonly present on the exteriors of motor vehicle bodies may be mounted using various mounting techniques. Some objects have shapes that fit to complementary shaped portions of a vehicle body without any additional means of attachment other than their particular shapes.

An example of such as object is an edge or corner molding that can simply snap onto a correspondingly shaped corner or edge. No fasteners or other means of attachment such as adhesive are needed to hold such a molding in place. However, depending on the materials of the molding and the body, and on how the molding fits to the body, the process of snapping the object onto a corner or edge may scratch or mar the finish of the body. A scratch that penetrates the full depth of the finish to bare metal would of course be especially undesirable.

Mechanical fasteners and fastening systems are traditional means of attaching objects to vehicle bodies. Screws inherently pierce the panel itself. When a fastener and the panel are both metals there is likely to be some exposure of metal, either on the exterior or the interior of the panel. While sealing of any exposed metal may be possible, such sealing typically involves an extra step, and even when performed, that extra step may not accomplish the desired objective if not performed with due care.

The use of adhesives to mount certain objects on bodies has gained increased acceptance over the years because of improvements in available adhesives that provide the tenacity and durability that are required for outside environments that are potentially subject to weather extremes of heat and cold and high and low humidity. Certain objects can be mounted by the use of such adhesives alone, and hence any risk of scratching or marring the surface finish of a vehicle body is essentially eliminated.

However, the beneficial properties of such adhesives may create other problems. An object that has a mounting face containing adhesive of great tenacity must be precisely placed before the object is moved against a vehicle body to place the adhesive in contact with the body. An adhesive that resists separation of the object from the body after such contact complicates removal of the object and its re-alignment and subsequent re-adhering to the body.

Some objects are mounted using a combination of adhesive and mechanical fastening. Undesired consequences such as those described above can still apply to such combined means of attachment.

SUMMARY OF THE INVENTION

The inventors have discovered a novel method for mounting objects on the exteriors of motor vehicle bodies that avoids such undesired consequences, especially when a combination of adhesive and mechanical fastening is employed for mounting a particular object.

Rather than presenting exposed adhesive to a surface of a vehicle body against which a mounting face of the object is to be disposed, pressure sensitive adhesive on the mounting face is covered by a very thin layer of dissolvable, or dissolving, paper. Hence, when the object is moved to place its mounting face against the body, the adhesive is kept separated from the body surface by the thin paper layer and thereby kept from being effective in adhering the object to the body. A mechanical fastening means is used to forcefully hold the mounting face of the object against the body. Thereafter, the mounting is exposed to a wash that causes liquid to begin to be absorbed into the paper through the edge of the outer perimeter of the paper. Continued washing allows the liquid to be absorbed by more and more of the paper, but as the paper absorbs liquid, it also begins to dissolve in the liquid, exposing the adhesive as it does. The dissolvable paper is of such thinness that at least a substantial area of the exposed adhesive will come into contact with the body surface and adhere the object to the body. The wash can be any liquid that dissolves the paper, but typically water will be used.

The mechanical fastening means may aid in providing sufficient force on the object to force exposed adhesive into contact with the surface of the body. The object may have a certain amount of inherent resiliency that aids in forcing the exposed adhesive against the body. The object may also be rigid but have a resilient layer that contains the adhesive.

Depending on the nature and the geometry of the object being mounted, a given design may include features for facilitating escape of wash liquid and dissolved paper from between the mounting face of the object and the surface of the vehicle body. Because the adherence of the adhesive to the surface of the body will begin to occlude flow, it is to be appreciated that more interior portions of the paper may not completely dissolve and escape. It is also to be appreciated that the particular location and shape of the adhesive and dissolving paper are apt to be a function of the particular design and should therefore be chosen to assure that desired areas will be adhered when washed.

The inventors further contemplate that washing need not necessarily be performed during the process of mounting an object on a vehicle body in a manufacturing facility. They recognize the possibility that an object can be mounted by mechanical fastening, with subsequent water washing for dissolving the paper occurring when the vehicle is exposed to rain.

One general aspect of the invention relates to a method for mounting an object on the exterior of a motor vehicle body. The method comprises mechanically fastening the object to the body to place a mounting face of the object that contains pressure sensitive adhesive in confrontation to a surface of the body but separated from the surface of the body by a layer of dissolvable paper, and then wetting the dissolvable paper with a solvent to cause at least some of the paper to dissolve and consequently cause the exposed adhesive to come into contact with the surface of the body.

Another aspect of the invention relates to an object for mounting on an exterior surface of a motor vehicle panel comprising a mechanical fastener for fastening the object to the panel to place a mounting face of the object against the exterior surface and a pressure sensitive adhesive on the mounting face that is covered by a thin layer of dissolving paper that will dissolve when wetted with a solvent to expose the adhesive and enable the adhesive to adhere to the exterior surface.

The foregoing, along with further features and advantages of the invention, will be seen in the following disclosure of a presently preferred embodiment of the invention depicting the best mode contemplated at this time for carrying out the invention. This specification includes drawings, now briefly described as follows.

DESCRIPTION OF THE PREFERRED EMBODIMENT

Figure 1:
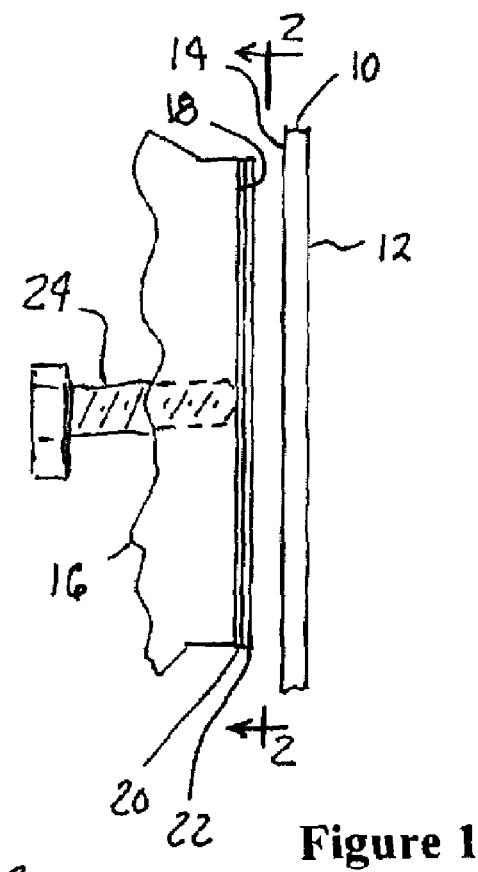
FIG. 1 is a diagrammatic view not to any particular scale illustrating general principles of the invention.

FIG. 1 shows a panel 10 of a motor vehicle body having an interior surface 12 and an exterior surface 14. An object 16 that is to be mounted on surface 14 has a mounting face 18. A pressure sensitive adhesive 20 covers all or some of face 18. A layer of dissolving paper 22 covers adhesive 20. A mechanical fastening system 24, such as one or more fasteners for example, fastens object 16 to panel 10.

Figure 2:
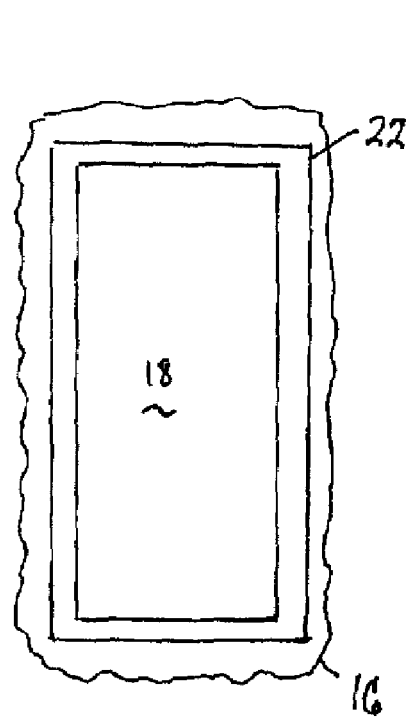
FIG. 2 is a view in the direction of arrows 2-2 in FIG. 1.

Although the view of FIG. 2 shows mounting face 18 to be rectangular in shape, that view is intended to show a generic mounting face. It also shows the adhesive to be present only on the perimeter margin of the mounting face. Dissolving paper 22 comprises a rectangular strip covering only the adhesive. An example of a width of the strip of dissolving paper is 10 millimeters.

FIG. 1 shows object 16 in a position ready to be mounted on panel 10. Adhesive 20 is not exposed to surface 14 because it is covered by paper 22. When object 16 is moved to the right to place mounting face 18 against the body, adhesive 20 is kept separated from surface 14 by paper 22 and thereby kept from being effective in adhering the object to the body. The mechanical fastening system 24 is engaged with the panel to forcefully hold mounting face 18 against surface 14.

The mounting is then exposed to a water wash that causes water to begin to be absorbed into paper 22 through the edge of the outer perimeter of the paper. Continued washing allows the water to be absorbed by more and more of the paper, but as the paper absorbs water, it also begins to dissolve in the water exposing the adhesive, as it dissolves. The dissolvable paper is of such thinness that substantially all of the exposed adhesive will come into contact with the body surface and adhere to the body. As the paper dissolves, the adhesive is forced against exterior surface 14 to create a perimeter seal of the margin of the mounting face to the body panel.

The structure of object 16 proximate mounting face 18 may have a physical characteristic that allows it to flex slightly when fastened on the body panel by fastening system 24, creating a slight tensioning in the fastened object that is very slightly relieved as the dissolving paper dissolves causing the pressure sensitive adhesive to be applied with some degree of force to the panel exterior surface 14. In other words, relief of the slight tensioning that was created when the object was mechanically fastened to the body causes the exposed adhesive to come into contact with the exterior surface of the body.

Figure 3:
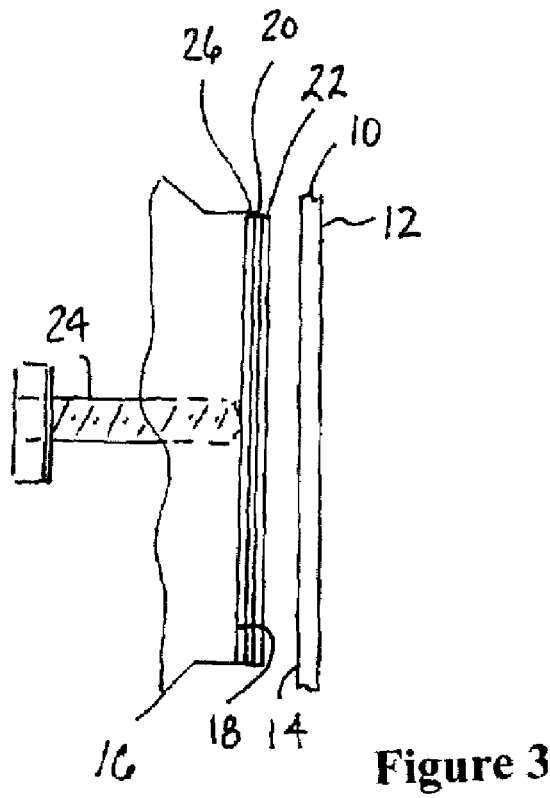
FIG. 3 is another diagrammatic view similar to FIG. 1.

Another construction is shown in FIG. 3 to comprise a resilient layer 26 on the mounting face. Adhesive is present on all or some of one side of the resilient layer and covered by dissolving paper of an appropriate shape. The shape may be the same as shown in FIG. 2. The opposite face of the resilient layer may be adhered by pressure sensitive adhesive to the mounting face.

When the object is mounted by engaging fastening system 24 with body panel 10, the resilient layer 26 is compressed to some degree. As the paper dissolves, the resiliency of layer 26 aids in forcing the exposed adhesive to adhere and seal to the body panel.

Dissolving paper is commercially available from Mishima Paper Co., Ltd. A process for making dissolving paper is described in U.S. Pat. No. 3,431,166.

While a presently preferred embodiment of the invention has been illustrated and described, it should be appreciated that principles of the invention apply to all embodiments falling within the scope of the following claims.

What is claimed is:

1. A method for mounting an object on a motor vehicle body, the method comprising:
    using a mechanical fastener to mechanically fasten the object to the body to place a mounting face of the object that contains pressure sensitive adhesive in confrontation to an exterior surface of the body but separated from the exterior surface of the body by a layer of dissolvable paper; and
    then wetting the dissolvable paper with a solvent to cause at least some of the paper to dissolve and expose underlying pressure sensitive adhesive, and as a consequence, to cause the exposed pressure sensitive adhesive to come into contact with the exterior surface of the body.

2. The method as set forth in claim 1 wherein the step of using a mechanical fastener to mechanically fasten the object to the body to place a mounting face of the object that contains pressure sensitive adhesive in confrontation to an exterior surface of the body but separated from the exterior surface of the body by a layer of dissolvable paper comprises creating tension in the object, and the step of wetting the dissolvable paper with a solvent to cause at least some of the paper to dissolve and expose underlying pressure sensitive adhesive, and as a consequence, to cause the exposed pressure sensitive adhesive to come into contact with the exterior surface of the body comprises causing the exposed pressure sensitive adhesive to come into contact with the exterior surface of the body by a slight release of tension in the object that was created when the object was mechanically fastened to the body.

3. The method as set forth in claim 1 wherein the mounting face of the object comprises a resilient layer on which the pressure sensitive adhesive is present, the step of using a mechanical fastener to mechanically fasten the object to the body to place a mounting face of the object that contains the pressure sensitive adhesive in confrontation to an exterior surface of the body but separated from the exterior surface of the body by a layer of dissolvable paper includes causing compression of the resilient layer, and the step of causing the exposed pressure sensitive adhesive to come into contact with the exterior surface of the body comprises resiliency of the resilient layer aiding in forcing the exposed pressure sensitive adhesive to adhere and seal to the exterior surface of the body.

4. The method as set forth in claim 1 wherein the step of causing the exposed pressure sensitive adhesive to come into contact with the exterior surface of the body comprises causing the exposed pressure sensitive adhesive to seal a perimeter margin of the mounting face of the object to the exterior surface of the body.

5. An object for mounting on an exterior surface of a motor vehicle panel comprising a mechanical fastener for fastening the object to the panel to force a mounting face of the object against the exterior surface, and a pressure sensitive adhesive on the mounting face that is covered by a thin layer of dissolving paper that will dissolve when wetted with a solvent to expose the adhesive and allow the adhesive to adhere to the exterior surface.

6. The object as set forth in claim 5 wherein the object comprises a resilient layer on the mounting face containing the pressure sensitive adhesive.

7. The object as set forth in claim 6 wherein the pressure sensitive adhesive is disposed only on a perimeter margin of the mounting face and the dissolving paper comprises a strip covering only the adhesive.

* * * * *